July 23, 1968
J. W. TODD ET AL
3,393,551
GAS CHROMATOGRAPH VALVE
Filed Aug. 17, 1964
2 Sheets-Sheet 1
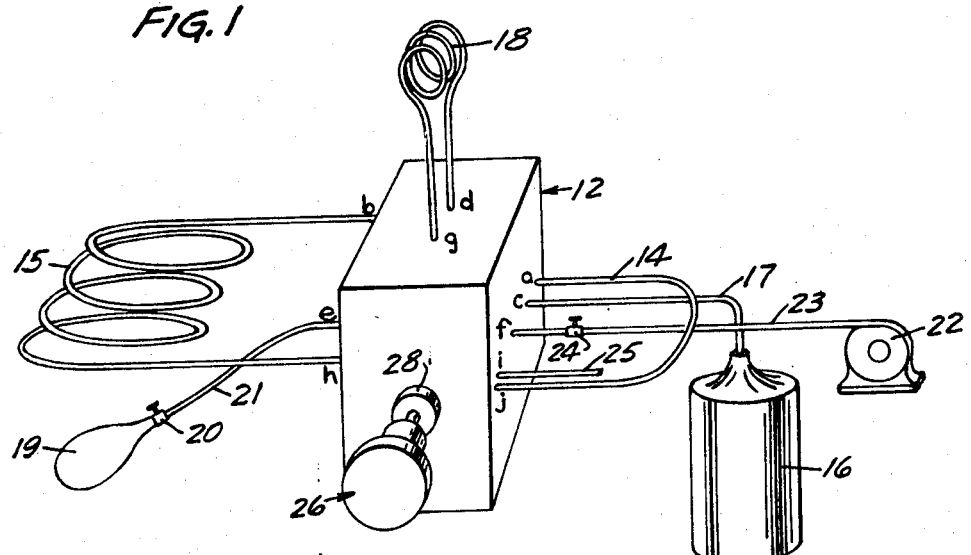
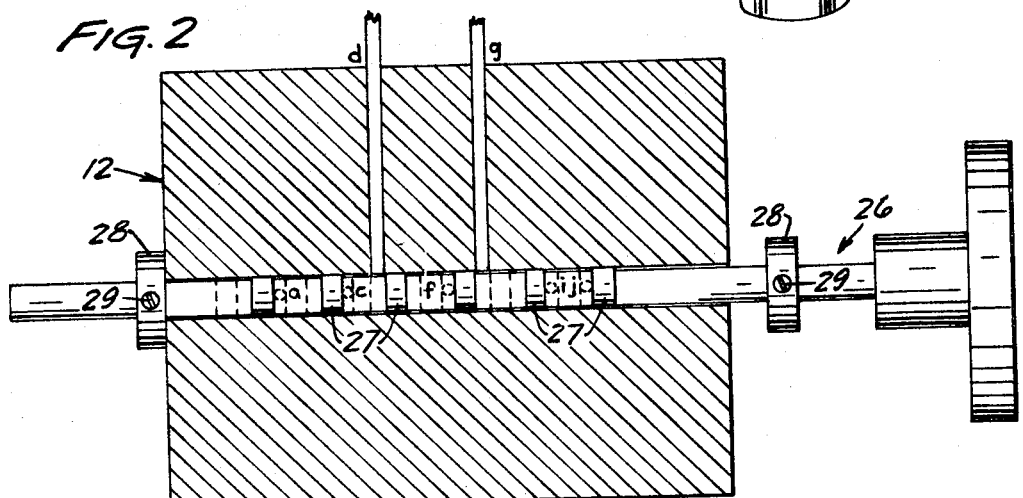
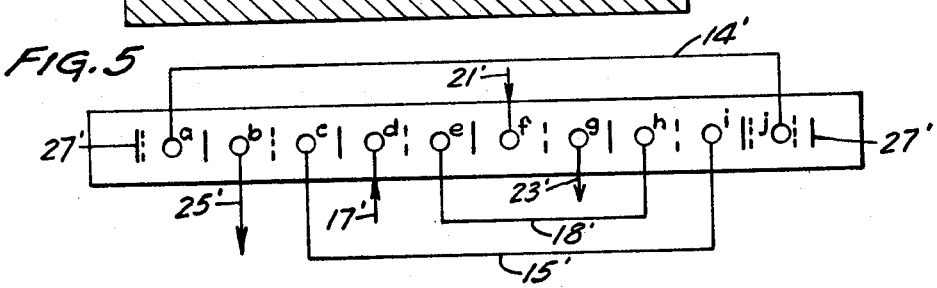
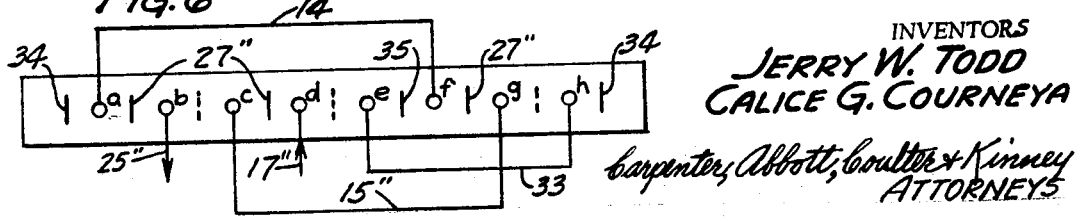
INVENTORS
JERRY W. TODD
CALICE G. COURNEYA
Carpenter, Abbott, Coulter & Kinney
ATTORNEYS

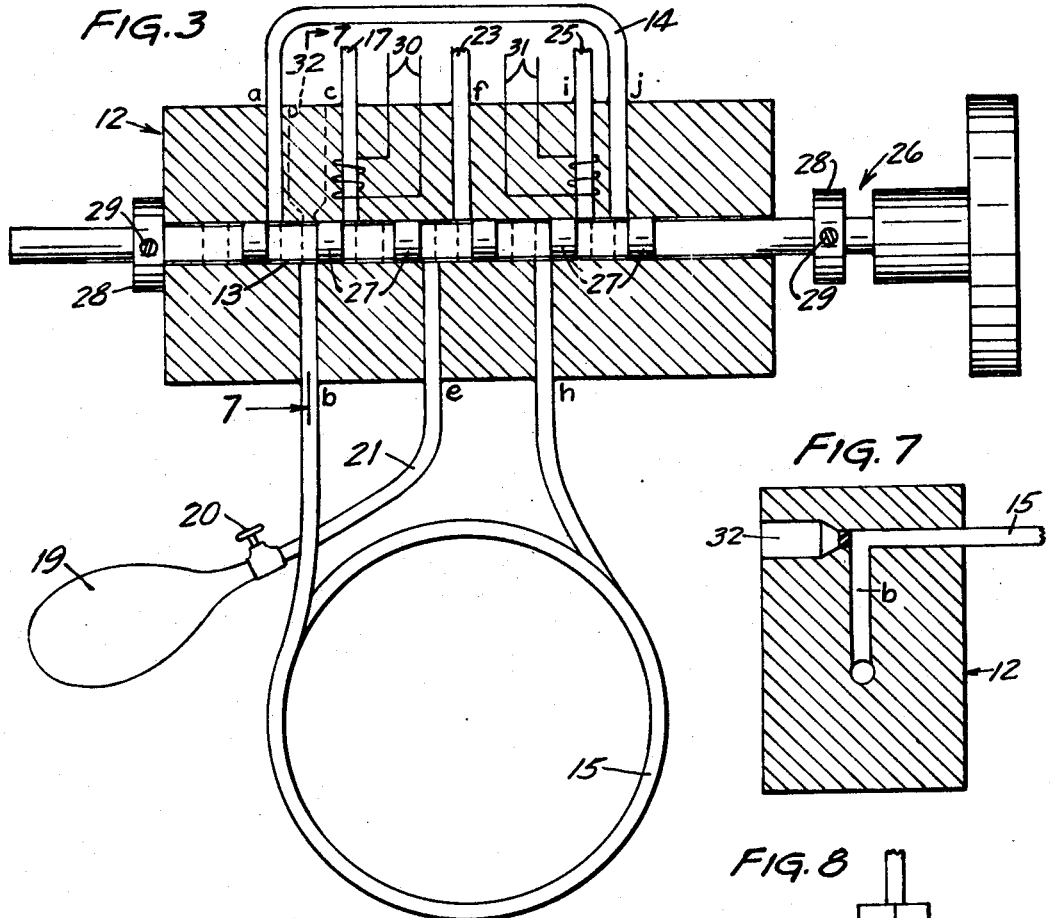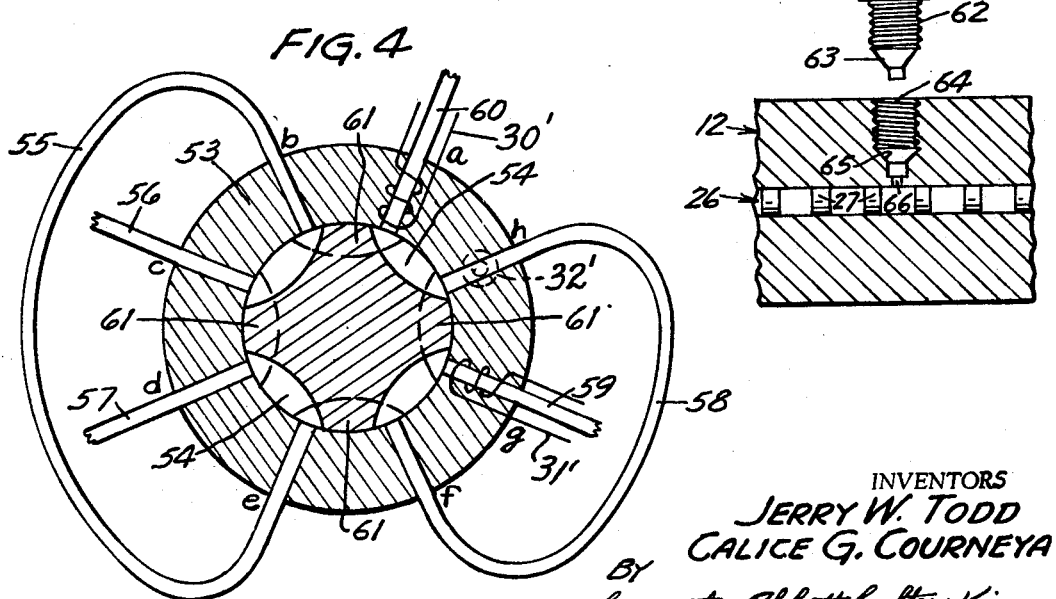

United States Patent Office 3,393,551
Patented July 23, 1968

3,393,551
GAS CHROMATOGRAPH VALVE
Jerry W. Todd, White Bear Lake, and Calice G. Courneya, St. Paul, Minn., assignors to Minnesota Mining and Manufacturing Company, St. Paul, Minn., a corporation of Delaware
Filed Aug. 17, 1964, Ser. No. 389,952
4 Claims. (Cl. 73—23.1)

ABSTRACT OF THE DISCLOSURE

A single-unit instrument capable of performing a plurality of functions as required in gas chromatography but composed of a minimum number of individual components. The essential component is a single multiport valve assembly incorporating within it as a single unit the functions of the major components of conventional gas chromatographs, e.g. gas sampling valve, injection port, backflush valve and detector. The valve assembly is provided with external connections to the proper ports for a separating column, sample gas loop, carrier gas inlet and outlet, sample gas inlet and outlet, and electrical connections to the detector sensing elements. The device of the invention operates to minimize the trailing-off of the sample gas by reducing the internal and dead spaces created by interconnections, etc. between the various functional parts, and to eliminate the leakage of foreign gases past the sample gas seals by the novel positioning of the sample loops so that reduced pressure can draw only harmless carrier gas past the seals.

---

This invention relates to a single unit instrument that is capable of performing a plurality of the functions required in gas chromatography.

Heretofore, a complete gas chromatograph included a series of interconnected instrument blocks, one of which functioned as a gas sampling valve, another as a liquid gas injection port, a third as a backflush valve with the separating column attached, and a fourth as a detector. The results of a chromatograph reading are dependent on the exacting performance of the instrumentation utilized, and it follows that an instrument block for use in a chromatograph system must be well engineered and well constructed in order to provide optimum performance. Such equipment is expensive to construct, and, therefore, the prior art gas chromatograph equipment is very costly by reason of the requirement for a plurality of such instrument blocks.

The chromatograph reading is the recordation of impulses received from the detector as the various components of the separated sample gas pass through the detector elements. To achieve accurate recordings, it is important that the components pass through the detector as compact and clearly definable masses. It follows that the gas sample must first be introduced and then maintained as a compact unit throughout the system. Introduction of the gas sample as a compact unit is satisfactorily accomplished by conventional gas sample valves. However, prior art devices require extensive use of conduits and interconnections to transfer the sample gas between the numerous instrument blocks as it proceeds through the various functional operations. The disturbance that is thus encountered by the sample gas at every turn and interconnection causes a trailing-off or spreading of the sample gas and thus reduces the accuracy of the chromatograph reading and reduces utility of the gas chromatographic method.

It is also important to the accuracy of the chromatograph reading that essentially all foreign gases, i.e., gases other than the sample gas and the carrier gas, be prevented from leaking into the system. Typical problem gases are often oxygen, nitrogen, carbon dioxide and water vapor in air. Such leakage is of particular concern when the sample to be introduced into the system is present only in a very small quantity of such components. The usual method of accomplishing such introduction is to first reduce the pressure in the sample gas loop of the sample gas valve, then to connect the sample gas container to the loop to thus permit flow of sample from its container into the evacuated sample loop, and then to activate the valve which connects the loop into the carrier gas stream. In the prior art devices, the seals in the gas sample valve are not usually sufficiently leak tight to prevent the reduced pressure from pulling air from the other side of the seals into the loop. The situation is further aggravated in that the seals during normal use are subjected to repeated frictional sliding contact with the wall of the valve barrel which tends to rapidly wear down the peripheral edges of the seals. Even a slight wearing of the seals reduces the sealing ability thereof, and thus the seals of the prior art devices quickly become inadequate to prevent leakage of foreign gases into the chromatographic system.

It is therefore the objects of the present invention to provide a less expensive gas chromatograph by combining the various functions into a single unit instrument, to minimize the trailing-off of the sample gas by reducing the internal volume and dead spaces created by interconnections, etc. between the various functional operations, and to eliminate the leakage of foreign gases past the sample gas seals by the novel positioning of the sample loop so that reduced pressure can draw only harmless carrier gas past the seals. Other objects and advantages of the invention are apparent by reference to the following detailed description and drawings in which:

FIGURE 1 is a perspective view of one form of the invention;

FIGURE 2 is an elevation view in section of the form of the invention illustrated in FIGURE 1;

FIGURE 3 is a plan view in section of the form of the invention shown in FIGURE 1;

FIGURE 4 is a plan view in section of an alternative form of the invention;

FIGURES 5 and 6 are flow diagrams of alternative embodiments of this invention;

FIGURE 7 is a view of one form of a liquid gas injection port as if taken on section lines 7—7 of FIGURE 3; and FIGURE 8 shows a means to accomplish satisfactory connection of the conduits to the instrument block.

Referring first to FIGURES 1-3, a block 12 is provided with a cylindrical valve barrel 13. Ten linearly spaced ports $a$–$j$ extend through the block and into the barrel. A return tube 14 is connected to ports $a$ and $j$ and a separating column 15 is connected to ports $b$ and $h$. Carrier gas 16 is connected to port $c$ by means of tube 17 and a sample loop 18 is connected to ports $d$ and $g$. A sample gas bulb 19, with shut-off valve 20, is connected by tube 21 to port $e$. A vacuum pump 22 is connected to port $f$ by means of tube 23 which contains shut-off valve 24. Exit tube 25 is connected to port $i$.

A plunger 26 is slidably mounted in the valve barrel 13 and is provided with a series of linearly spaced seals 27. Stop members 28 on each end of the plunger are adjustable by means of set screws 29. Said seals are positioned and said stop members adjusted so that when plunger 26 is moved to the extreme right as illustrated in FIGURES 2 and 3, said seals are located at each end of the valve barrel and between ports $b$ and $c$, $d$ and $e$, $f$ and $g$, and $h$ and $i$. When the plunger is moved to the extreme left as illustrated in dotted lines, said seals are relocated between ports *a* and *b*, *c* and *d*, *e* and *f*, and *g* and *h*.

Considering first an example whereby the unknown sample is a very small quantity of gas contained within bulb 19 and possibly at reduced pressure, the plunger is moved to the extreme left as shown in dotted lines in FIGURES 2 and 3. In this position, the carrier gas will enter the barrel through port *c*, then pass directly through port *b* into the separating column. It will leave the separating column through port *h* and pass into exit tube 25 through port *i*. While the carrier gas is thus circulating, valve 24 is opened and pump 22 activated so as to reduce the pressure within the sample loop to a low value. Shut-off valve 24 is closed and valve 20 is opened so that sample gas can flow from the bulb into the evacuated sample loop. Plunger 26 is then moved to the right as illustrated in solid lines in FIGURES 2 and 3. This separates ports *b* and *c* and joins ports *c* and *d*. Thus the carrier gas flows from port *c* into the sample loop. Port *g* has been joined with port *h* and thus the sample gas is pushed by the carrier gas into the separating column. Ports *b* and *a* have been joined, and therefore, as the gas leaves the separating column, it enters the return tube 14 through port *a*. Port *j* has been joined with exit port *i*, and thus the effluent, i.e., separated components of the sample gas and the carrier gas, is directed into exit tube 25 and past the detector 31.

Assuming that one of the components of the unknown gas mixture moves through the separating column at a much slower rate than the other components, when said faster components have left the separating column and have been identified by the detector, the separating column may be backflushed by merely returning the plunger to the dotted line position of FIGURES 2 and 3. The flow of the carrier gas will be reversed within the separating column, and the slow component within the column will be backed up and upon leaving port *h* will be directed out the outlet port *i* and past the detector.

The detector can be any of a number of well known types. One such type utilizes the difference in thermal conductivity of the gases. Thus, one leg of a Wheatstone bridge is comprised of a reference element 30, and the other leg is comprised of the detector element 31. When the gas passing through tube 25 is the same as the gas passing through tube 17, the resistance of each leg is the same, and the bridge is balanced. However, when one of the components passes through the detector element, the difference in temperature causes a change in the resistance of that leg of the bridge. The bridge is thus thrown out of balance, and the resulting voltage imbalance is recorded. The time lapse, i.e., period from introduction to detection, is noted and compared against a chart containing the known time lapse of the various gases.

When there is an abundance of the unknown gas, as for instance when a gas line is being tested, the bulb 19 and pump 22 can be removed and tubes 21 and 23 merely inserted into the flow line of the unknown gas. Thus, when the plunger is located at the right as viewed in FIGURE 2, the unknown gas circulates through the sample loop, and when the plunger is moved to the left, ports *e* and *f* are joined, and the circulation of the unknown gas is continued directly from tube 21 to tube 23.

If the sample unknown is a liquid or a dissolved solid, the plunger is positioned to the right and the solution is syringe-injected directly into the separating column through the rubber septum in the injection port 32. Analysis of most liquid and dissolved solid samples will require immersion of the assembly in an elevated temperature bath in order to volatilize the sample sufficiently for analysis. A separate heating bath for the separating column should permit temperature programmed operation of the separating column. If desired, gas samples may also be syringe-injected in this manner, and of course in either instance, backflushing could still be accomplished by merely moving the plunger to the left.

It is pointed out that with the construction as shown, whenever the sample loop is being loaded, carrier gas is being circulated through the separating column. Thus, only carrier gas resides on the other side of the sample loop valve seals, and it follows that if the seals should leak, only carrier gas can leak into the sample loop. In that the carrier gas is considered neutral by the detector, any slight leakage that should occur will not affect the accuracy of the chromatograph reading. This feature is considered to be very important in preventing contamination of the sample gas.

It will be understood that the arrangement of the ports can be somewhat altered without changing the operation of the instrument. This is shown in the flow diagram of FIGURE 5. Return tube 14' is connected to ports *a* and *j*; separating column 15' is connected to ports *c* and *i*; and sample loop 18' is connected to ports *e* and *h*. Sample gas inlet 21' is connected to port *f*, and the sample gas outlet 23' is connected to port *g*. Carrier gas inlet 17' is connected to port *d*, and the partitioned exit tube 25' is connected to port *b*. The sample loop is loaded when the seals 27' are positioned to the right as illustrated by the dotted lines. In this position the carrier gas flows from the inlet 17' directly into separating column 15', then through return tube 14' and out the exit tube 25'. After loading, the plunger is moved to the left to reposition the seals so that the carrier gas will first pass through the sample loop 18', then to the separating column 15' and then through the outlet tube 25'.

If the sample is introduced into the carrier gas stream further upstream from the instrument block, the sample inlet and outlet ports may be omitted from the instrument block, and the apparatus will function as a backflush valve-detector combination. Of course the reference sensing element should be moved further upstream in the carrier gas line ahead of the sample inlet so that it will sense only pure carrier gas. In such instances, it may be preferable to rearrange the tubes and ports as illustrated by the flow diagram of FIGURE 6. Return tube 14" is connected to ports *a* and *f*, the separating column 15" is connected to ports *c* and *g*, and the reversing tube 33 is connected to ports *e* and *h*. The inlet 17" is connected to port *d*, and outlet 25" is connected to port *b*. Seals 34 are positioned at each end of the aperture, and seal 35 is positioned between ports *e* and *f*. The remaining three seals 27" assume dual positions. In a first position, as shown in solid lines, the seals are between ports *a* and *b*, *c* and *d*, and *f* and *g*. In a second position, as shown in dotted lines, the seals are between ports *b* and *c*, *d* and *e*, and *g* and *h*. It will thus be seen that when the seals are in said first position, the flow of gas from the inlet will first pass through the reversing tube 33, then pass through the separating column 15" and on to the detector and exit tube 25. In the second position, the flow will be through the separating column 15" first and then return through the return tube 14" and on to the detector and exit tube 25. It will be understood that several other design manifestations of this backflush-detector combination are possible.

The invention may also be incorporated in rotary type valves as shown in FIGURE 4, which illustrates a completely unitized gas chromatograph and comprises an instrument block 53 having a cylindrical cavity 54 and eight circumferentially spaced ports *a–h*. A carrier gas inlet 60 is connected to port *a*, and the succeeding ports in counterclockwise rotation are respectively connected to one end of a sample loop 55, a sample gas inlet 56, a sample gas outlet 57, the other end of the sample loop, one end of a separating column 58, the outlet for spent carrier gas 59, and the other end of the separating column. Detector means 30' associated with carrier gas inlet 60 and detector means 31' associated with carrier gas outlet 59, are provided, corresponding to the detector means shown in FIGURE 3. Likewise, sample injection port 32' is provided, corresponding to sample injection port 32 shown in FIGURES 3 and 7. A rotary seal is rotatably mounted in the cavity and incorporates sealing members 61 positioned between every other of the ports in a first position as shown in solid lines, and positioned between the intermediate ports when the seal is rotated to a second position as shown in dotted lines.

It will be seen that four separate and rotatable chambers are thus provided to permit communication in the first position between ports $b$ and $c$, $d$ and $e$, $f$ and $g$, and $h$ and $a$. Thus fluid flows from the carrier gas stream through inlet 60, to the separating column through port $h$, and then through port $f$ to the outlet 59. At the same time, sample gas is flowing from inlet 56, through the sample loop 55 and out through the outlet 57. When the seal is repositioned as shown in dotted lines, the carrier gas flows from inlet 60 through the sample loop and then into the separating column and finally out the partitioned gas outlet 59. It will be noted that the flow of sample gas is permitted to continue directly from inlet 56 to outlet 57, and it will also be noted that the separating column may be backflushed by merely returning the rotary seal to the first position.

FIGURE 8 illustrates a means for making connection of the tubes to the ports. The tubes are inserted through threaded annular plugs 62 and ferrules 63. The assembled ferrule, plug and tube are inserted into the threaded socket 64, and the plug is turned into the female threads of the socket. Ferrule 63 is bottomed near the valve barrel and is seated against a cone-shaped bearing surface 65. As the plug is tightened, the bottom edge of the ferrule is biased inwardly by the bearing surface to thereby tightly grip the tube. Such gripping securely holds the tube against the mouth of a port 66 at the bottom of the socket and at the same time provides a tight seal which prevents leakage of the gas from the tube into the socket beyond the point of said gripping. It will be noted that the ferrule will not turn while the plug is being screwed into the socket due to the small area of contact between the plug and the ferrule as related to the larger area of contact between the bottom edge of the ferrule and the bearing surface. This method of connecting tubes to the instrument minimizes internal volume and dead space, as well as insuring a tight seal.

It will be understood that the above descriptions merely relate to preferred embodiments of the invention, and modifications may be made without departing from the scope of the invention.

What is claimed is:

1. A unitized gas chromatograph comprising an instrument block having a linear type valve barrel and ten axially spaced ports extending into said valve barrel, a return tube connecting the outermost end ports, a separating column having its ends connected to a pair of the ports inside the return tube ports, a sample loop connected to a pair of the ports inside the separating column ports and a pair of the ports between the sample loop ports comprising sample gas inlet and outlet ports, a carrier gas inlet port between one separating column port and one sample loop port, and the last of said ten ports between the other separating column port and one return tube port comprising a carrier gas effluent outlet, a valve plunger slidably mounted in said valve barrel and having first and second axial positions therein, and axially spaced seals carried by said plunger, the first axial position of said plunger communicating the carrier gas inlet port with said one column port, said other column port with the carrier gas effluent port and the sample gas inlet and outlet ports with the sample loop ports, the second axial position of said plunger communicating the carrier gas inlet port with said one sample loop port, the other sample loop port with said other column port, said one column port with the other return tube port, said one return tube port with the carrier gas effluent port and the sample gas inlet port with the sample gas outlet port.

2. A unitized gas chromatograph as defined in claim 1 including a detection means mounted in the block comprising a reference element in communication with the carrier gas inlet port and a detector element in communication with the port for carrier gas effluent.

3. A unitized gas chromatograph as defined in claim 2 including a liquid gas injection port in said instrument block adapted to communicate with the separating column at the end thereof adjacent the carrier gas inlet.

4. A gas chromatograph comprising an instrument block having a valve body, including means for providing carrier gas to and removing effluent gas from a chromatographic separating column, said valve body (A) having an enclosed cavity with ports extending thereinto, said ports being consecutively spaced apart along said valve body in the following order and comprising
  (1) an effluent gas outlet port,
  (2) a connecting port communicative with one end of a chromatographic separating column,
  (3) a carrier gas inlet port,
  (4) a connecting port communicative with one end of a sample gas loop,
  (5) a sample gas inlet port,
  (6) a sample gas outlet port,
  (7) a connecting port communicative with the other end of said sample gas loop,
  (8) a connecting port communicative with the other end of said chromatographic separating column; and
(B) sealing means in said valve cavity adaptable to linear or rotary motion having first and second sealing positions and being operative
  (1) in said first position to allow communication between the means for providing the carrier gas, the chromatographic separating column, and the means for removing effluent gas, and simultaneously to allow communication between the sample gas inlet port and the sample gas loop;
  (2) and in said second position to allow communication between the carrier gas inlet, the sample gas loop, the chromatographic separating column and the carrier gas outlet means;

said gas chromatograph having within said valve body a liquid-gas injection port adapted to communicate with said chromatographic separating column at the end thereof adjacent the carrier gas inlet.

References Cited

UNITED STATES PATENTS

| | | | |
|---|---|---|---|
| 3,041,869 | 7/1962 | Spracklen et al. | 73—422 X |
| 3,150,517 | 9/1964 | Kuffer et al. | 73—23.1 |
| 3,159,173 | 12/1964 | Fremon | 73—422 X |

RICHARD C. QUEISSER, *Primary Examiner.*

C. A. RUEHL, *Assistant Examiner.*